UNITED STATES PATENT OFFICE.

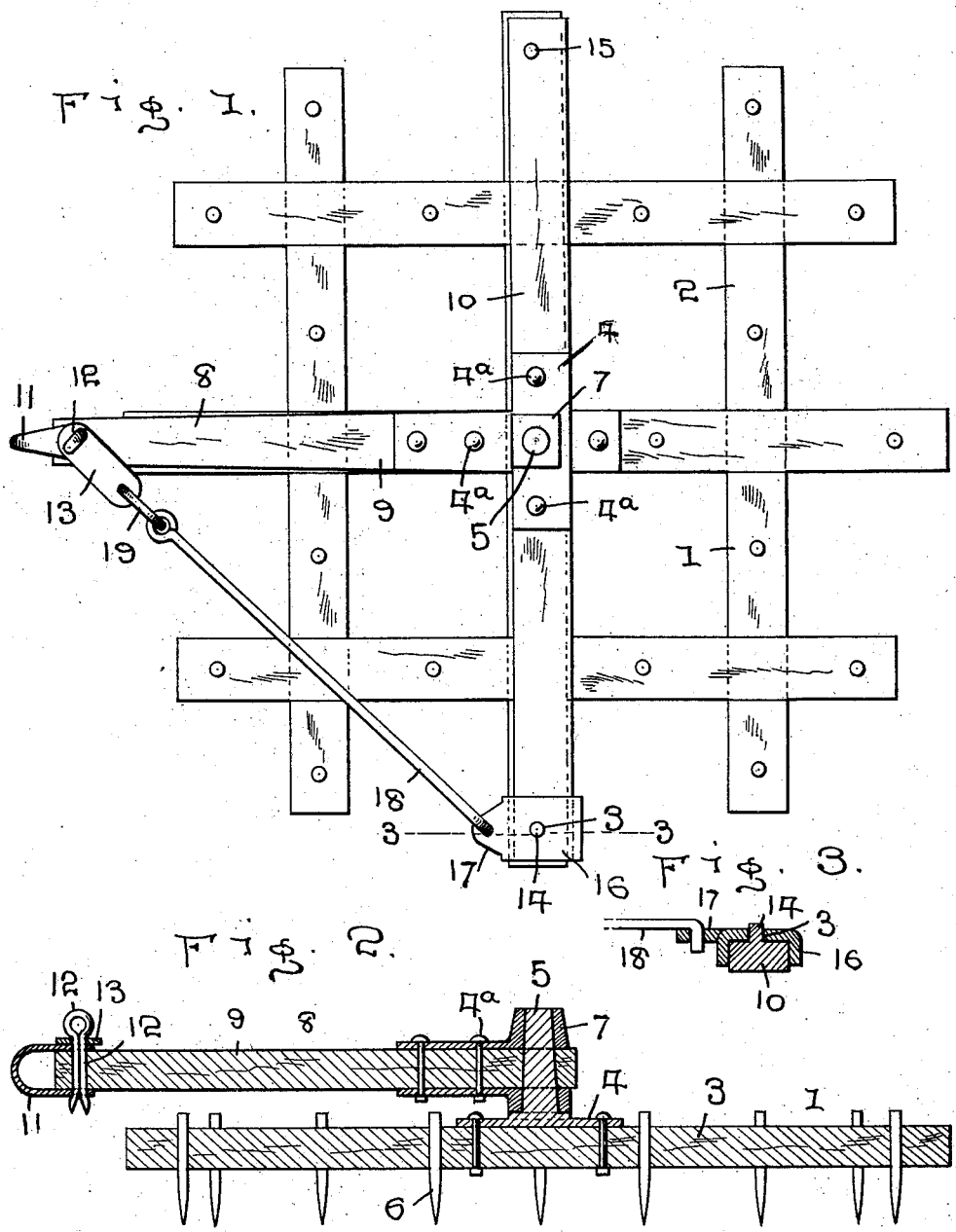

EARL L. HAWKINS, OF FAIRMONT, WEST VIRGINIA.

HARROW.

986,056.  Specification of Letters Patent.  Patented Mar. 7, 1911.

Application filed September 13, 1910. Serial No. 581,754.

*To all whom it may concern:*

Be it known that I, EARL L. HAWKINS, a citizen of the United States, residing at Fairmont, in the county of Marion and State of West Virginia, have invented certain new and useful Improvements in Harrows; and I do hereby declare the following to be a full, clear, and exact description of the invention, such as will enable others skilled in the art to which it appertains to make and use the same.

This invention relates to certain new and useful improvements in harrows, and more particularly to revolving harrows, the object being to provide a harrow which can be made to rotate in either direction or left free to move as an ordinary harrow.

A still further object of my invention is to provide a harrow having a revolving harrow frame which is carried by a draft frame in such a manner that when the harrow is drawn forwardly the same will revolve and thoroughly pulverize the soil over which it is being drawn.

Another object of my invention is to provide the draft frame with a removable weight which can be shifted in order to cause the harrow to revolve in the direction desired.

With these objects in view, the invention consists in the novel features of construction, combination and arrangement of parts, hereinafter fully described and pointed out in the claims.

In the drawing forming a part of this specification: Figure 1 is a top plan view of my improved harrow. Fig. 2 is a longitudinal vertical section. Fig. 3 is a detail section taken on line 3—3 of Fig. 1.

In carrying out my improved invention, I employ a toothed frame 1 composed of cross bars 2, and a central bar 3 which is provided with a central plate 4 secured thereon in any preferred way, as by bolts 4ª, and said plate is provided with a central conical trunnion 5 for the purpose later described. The bars of the frame are provided with teeth 6 which are secured therein in any suitable manner, and may be of any of the well known construction of harrow teeth now in use.

Mounted on the trunnion 5 is a pyramidal socket 7 carried by a draft frame 8 which consists of a central longitudinal bar 9 and a cross bar 10 which forms a substantially T shaped frame.

Secured to the forward end of the bar 9 of the frame 8 is a clevis 11 which is secured in position by a cotter pin 12 or bolt which carries a connected plate 13 which is pivotally mounted thereon and is provided with an apertured end as clearly shown.

The outer ends of the bar 10 of the frame 8 are provided with upwardly projecting pins 14 and 15 over one of which is adapted to be arranged a substantially inverted U-shaped weight 16 which is provided with an apertured lip 17 to which is connected a rod 18 which is connected to the plate 13 by a link 19. By changing this weight from one end of the bar 10 to the other, the harrow will be canted slightly in order to cause the same to revolve in the direction desired, as by placing the weight on the right hand end of the bar, the harrow will revolve to the right, and by placing a weight on the left hand end of the bar, the harrow will revolve to the left. By detaching the weight from the bar 10 of the frame, and the rod 18 and connecting said rod to the center of the frame the harrow will be drawn forwardly in such a manner that the same will not revolve. It will be seen that by this construction, the harrow can be converted into a harrow having a movement similar to an ordinary harrow or caused to revolve in either direction.

From the foregoing description, it will be seen that I have provided a harrow which is exceedingly simple and cheap in construction, and one in which the toothed frame carries a draft frame for drawing the harrow, said draft having a weight for changing the rotation of the harrow.

What I claim is:

1. The combination with a toothed frame having a central upwardly projecting conical trunnion, of a T-shaped draft frame provided with a socket mounted on said trunnion, pins arranged at the ends of the cross bar of said draft frame, a substantially inverted U-shaped weight having an opening adapted to be arranged over one end of said bar and over said pin, said weight being provided with a lip, a clevis carried by said draft frame, a plate carried by said clevis, a link carried by said plate, and a rod connecting said link to the lip of the weight.

2. In a harrow, the combination with a toothed frame having an upwardly projecting trunnion at the center, of a T-shaped draft frame provided with a socket to engage and rotate on said trunnion, a pin at each end of the cross bar of the draft frame, a weight having an opening adapted to receive either of said pins, a clevis carried by the draft frame, a plate carried by the clevis and a rod extended from said plate to said weight, said rod being removably engaged with the weight.

3. In a harrow, the combination with a toothed frame, of a T-shaped draft frame pivotally mounted on the toothed frame, a pin at each end of the cross bar of the draft frame, a weight having an opening adapted to be engaged with either of said pins to hold the weight in position on the draft frame, said weight having a lip, a plate carried by the draft frame and a rod connected to said plate and removably attached to said lip.

In testimony whereof I have signed my name to this specification in the presence of two subscribing witnesses.

EARL L. HAWKINS.

Witnesses:
C. W. HAWKINS,
FRANK R. AMOS.

Copies of this patent may be obtained for five cents each, by addressing the "Commissioner of Patents, Washington, D. C."